(12) United States Patent
Jindal et al.

(10) Patent No.: US 9,956,937 B2
(45) Date of Patent: May 1, 2018

(54) AIRBAG WITH AT LEAST ONE EXTENSION

(71) Applicant: Ford Global Technologies, LLC, Dearborn, MI (US)

(72) Inventors: Pardeep Kumar Jindal, Canton, MI (US); Djamal Eddine Midoun, Ann Arbor, MI (US); Edward Joseph Abramoski, Canton, MI (US); Rahul Makwana, Dearborn Heights, MI (US); Dev Tiwari, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/258,054

(22) Filed: Sep. 7, 2016

(65) Prior Publication Data

US 2018/0065590 A1 Mar. 8, 2018

(51) Int. Cl.
| | |
|---|---|
| *B60R 21/231* | (2011.01) |
| *B60R 21/233* | (2006.01) |
| *B60R 21/2338* | (2011.01) |
| *B60R 21/205* | (2011.01) |
| *B60R 21/013* | (2006.01) |

(52) U.S. Cl.
CPC .......... *B60R 21/233* (2013.01); *B60R 21/205* (2013.01); *B60R 21/231* (2013.01); *B60R 21/2338* (2013.01); *B60R 21/013* (2013.01); *B60R 2021/23382* (2013.01)

(58) Field of Classification Search
CPC ........ B60R 21/233; B60R 2021/23382; B60R 2021/23384
See application file for complete search history.

(56) References Cited

U.S. PATENT DOCUMENTS 4,043,572 A * 8/1977 Hattori .................... B60R 21/30
137/844
5,577,765 A * 11/1996 Takeda .................. B60R 21/233
280/729

(Continued)

FOREIGN PATENT DOCUMENTS

CN 201520273 U 7/2010
DE 10322612 A1 * 12/2004 ........... B60R 21/231

(Continued)

OTHER PUBLICATIONS

"Safety Systems and Safety Check, p. 1 of 3", http://www.procarcare.com/icarumba/resourcecenter/encyclopedia/icar_resourcecenter_encyclopedia_safety1.asp, Jun. 15, 2016 (8 pages).

(Continued)

*Primary Examiner* — Nicole T Verley
(74) *Attorney, Agent, or Firm* — Frank A. MacKenzie; Bejin Bieneman PLC

(57) ABSTRACT

An airbag includes a first side panel, a second side panel, a middle panel, and at least one extension. In the inflated position, the first side panel and the second side panel are spaced from each other by the middle panel, the middle panel having a top and a bottom, and a centerline between the first and the second side panels. The at least one extension is connected to at least one of the first side panel and the bottom of the middle panel, and is extendable in a direction away from the top of the middle panel in a deployed position.

20 Claims, 7 Drawing Sheets

(56) References Cited

U.S. PATENT DOCUMENTS

| | | | |
|---|---|---|---|
| 7,758,069 B2 * | 7/2010 | Enders | B60R 21/01 280/730.1 |
| 8,215,665 B2 | 7/2012 | Ohara et al. | |
| 8,376,396 B2 * | 2/2013 | Miller | B60R 21/206 280/729 |
| 8,414,022 B2 * | 4/2013 | Song | B60R 21/205 280/729 |
| 8,480,122 B2 * | 7/2013 | Ohara | B60R 21/205 280/729 |
| 9,296,358 B2 * | 3/2016 | Chen | B60R 21/233 |
| 2003/0034638 A1 * | 2/2003 | Yoshida | B60R 21/233 280/729 |
| 2003/0094794 A1 * | 5/2003 | Amamori | B60R 21/231 280/729 |
| 2006/0290118 A1 * | 12/2006 | Thomas | B60R 21/2338 280/739 |
| 2013/0200603 A1 * | 8/2013 | Bergenheim | B60R 21/36 280/762 |
| 2015/0074969 A1 | 3/2015 | Jindal et al. | |
| 2015/0158452 A1 * | 6/2015 | Choi | B60R 21/233 280/732 |
| 2015/0175116 A1 | 6/2015 | Cho et al. | |
| 2015/0258958 A1 * | 9/2015 | Belwafa | B60R 21/233 280/729 |
| 2015/0258959 A1 * | 9/2015 | Belwafa | B60R 21/233 280/729 |
| 2015/0298643 A1 * | 10/2015 | Schneider | B60R 21/233 280/729 |
| 2015/0321636 A1 * | 11/2015 | Jang | B60R 21/233 280/743.2 |
| 2016/0046254 A1 * | 2/2016 | Yamada | B60R 21/233 280/729 |
| 2016/0046257 A1 * | 2/2016 | Yamada | B60R 21/2338 280/729 |
| 2016/0059817 A1 * | 3/2016 | Umehara | B60R 21/233 280/729 |
| 2016/0096503 A1 * | 4/2016 | Lee | B60R 21/231 280/743.2 |
| 2017/0015271 A1 * | 1/2017 | Paxton | B60R 21/239 |
| 2017/0036639 A1 * | 2/2017 | Yamada | B60R 21/205 |
| 2017/0072897 A1 * | 3/2017 | Kruse | B60R 21/239 |
| 2017/0101071 A1 * | 4/2017 | Kruse | B60R 21/0136 |
| 2017/0129444 A1 * | 5/2017 | Fukawatase | B60R 21/233 |
| 2017/0158154 A1 * | 6/2017 | Kobayashi | B60R 21/205 |

FOREIGN PATENT DOCUMENTS

| | | | | |
|---|---|---|---|---|
| DE | 102014001952 A1 | | 8/2015 | |
| DE | 102015005482 A1 * | | 3/2016 | ........... B60R 21/239 |
| JP | 2008-120106 A | | 5/2008 | |
| JP | 2008143392 A | | 6/2008 | |
| JP | 2011-51549 A | | 3/2011 | |
| JP | 201168306 A | | 4/2011 | |
| JP | 2011-126367 A | | 6/2011 | |
| JP | 2011-126496 A | | 6/2011 | |
| WO | WO-2016132762 A1 * | | 8/2016 | ........... B60R 21/205 |
| WO | WO-2016147683 A1 * | | 9/2016 | ........... B60R 21/205 |

OTHER PUBLICATIONS

GB Search Report dated Feb. 12, 2018 re GB Appl. No. 1713839.7.

* cited by examiner

AIRBAG WITH AT LEAST ONE EXTENSION

BACKGROUND

Vehicles may include a variety of airbags that can deploy during vehicle impacts to absorb energy from occupants of the vehicles during the impact. The airbag may be a component of an airbag assembly including a base supporting the airbag, and an inflator in communication with the airbag for inflating the airbag from an uninflated position to an inflated position. Airbag assemblies may be supported on a steering wheel of the vehicle, an instrument panel of the vehicle, a headliner of the vehicle, etc.

The vehicle may include an impact sensing system in communication with the airbag assembly for sensing a vehicle impact and instructing the inflator to inflate the airbag when a vehicle impact is sensed. The impact sensing system may sense the direction of the impact and may selectively inflate, or not inflate, certain airbags of the vehicle or extensions of the airbag based on the type and magnitude of impact that is sensed, e.g., based on direction, magnitude, etc.

Vehicles are subject to a variety of impact tests. These impact tests may include those standardized by the National Highway Traffic and Safety Agency (NHTSA). These impact tests may include, for example, oblique impact tests. One such test is the small overlap rigid barrier (SORB) test in which the vehicle is impacted in a front corner of the vehicle at an oblique angle with a rigid barrier. In this test, a test dummy in a front passenger seat may be urged forwardly and toward the impacted corner of the vehicle. Another type of impact test is the new NHTSA frontal oblique impact test. In this test, the test dummy in the front passenger seat is urged in a cross-vehicle direction toward a driver side door of the vehicle or toward a passenger side door of the vehicle depending on whether the oblique impact is on the left or right side of the vehicle.

DETAILED DESCRIPTION

Figure 1:
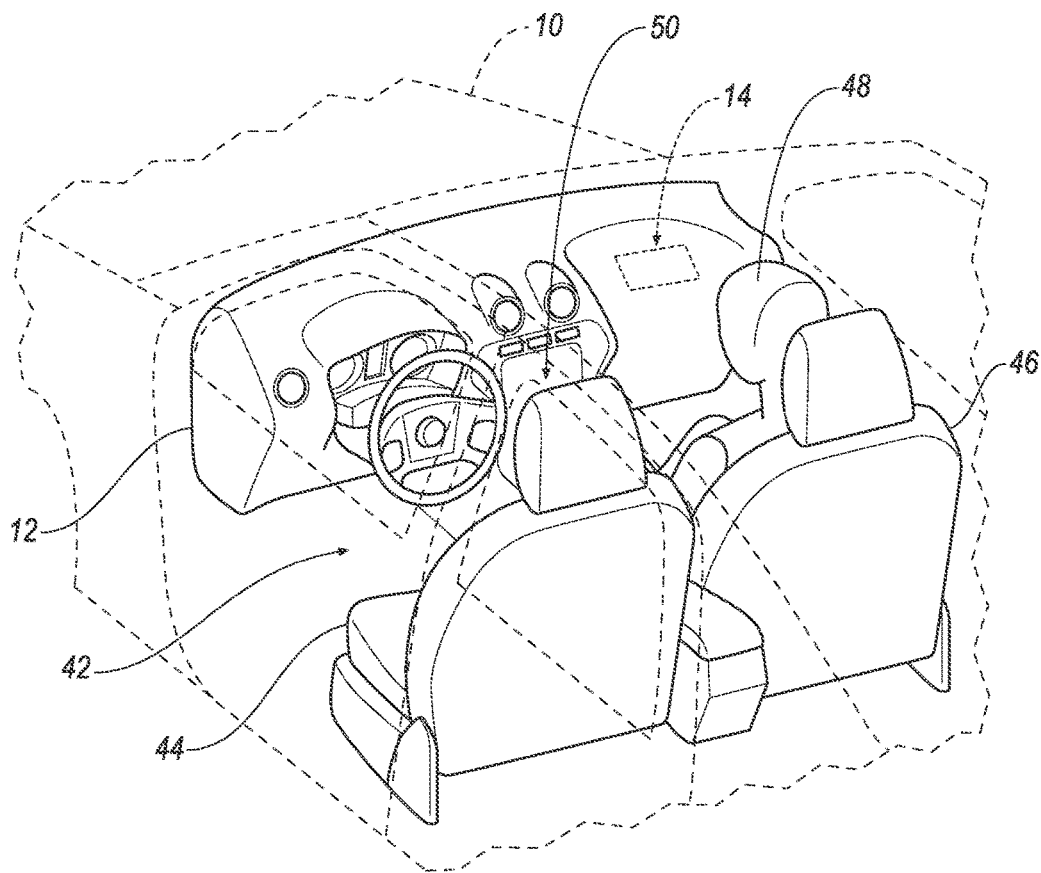
FIG. 1 is a perspective view of a portion of a vehicle including an occupant seated in front of an instrument panel.
Figure 2:
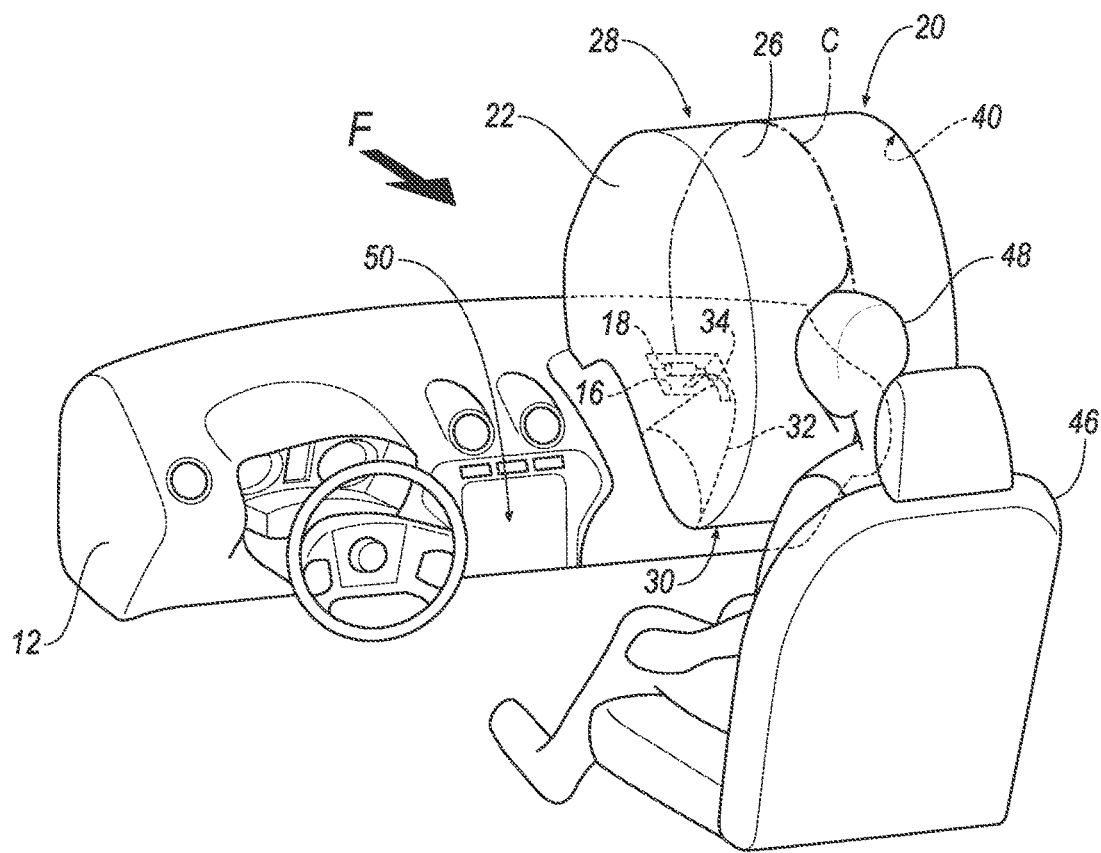
FIG. 2 is a perspective view of the occupant moving forward and impacting an airbag in an inflated position, and a tether connecting a base to an extension, with the extension in an undeployed position.
Figure 3:
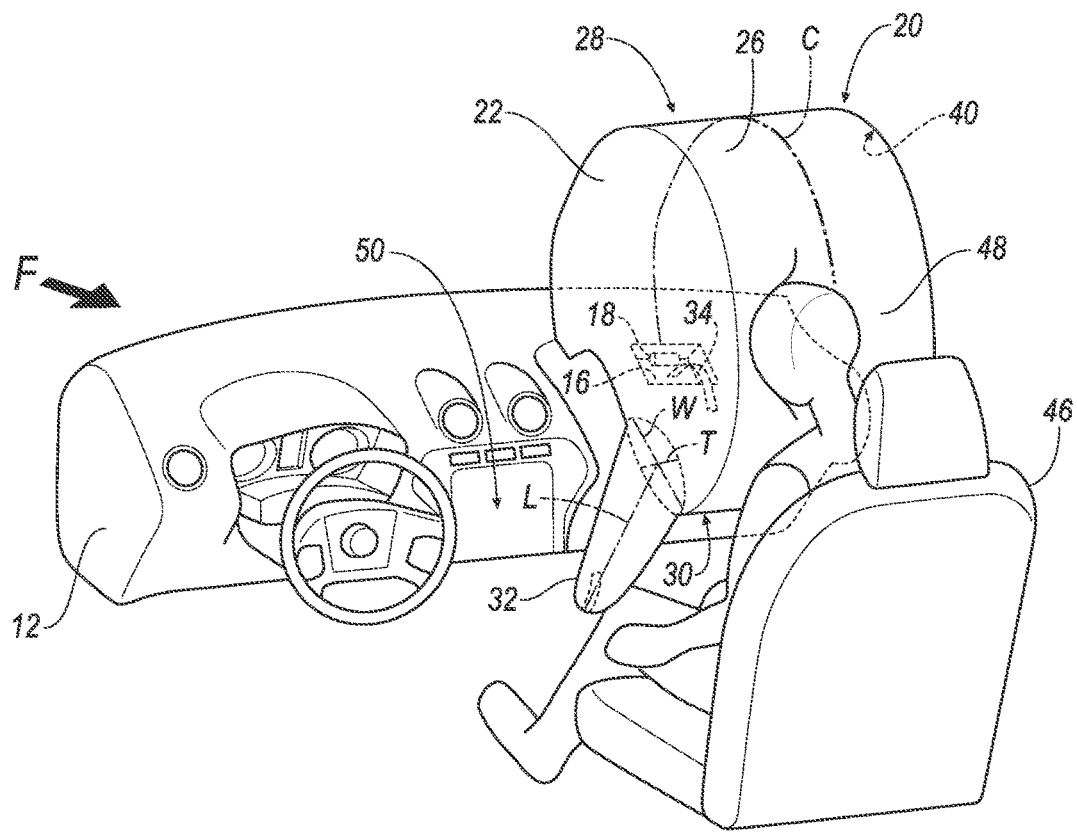
FIG. 3 is a perspective view of the occupant moving forward and to the left and impacting the airbag in the inflated position, and the tether released from the base, with the extension in a deployed position.

With reference to the Figures, wherein like numerals indicate like parts throughout the several views, a vehicle 10 may include an instrument panel 12, as shown in FIGS. 1-3. An airbag assembly 14 may be supported by the instrument panel 12. The airbag assembly 14 can include a base 16, an inflator 18, and an airbag 20. The base 16 is supported by the instrument panel 12 and may support the inflator 18 and the airbag 20, with the inflator 18 in fluid communication with the airbag 20.

Figure 4:
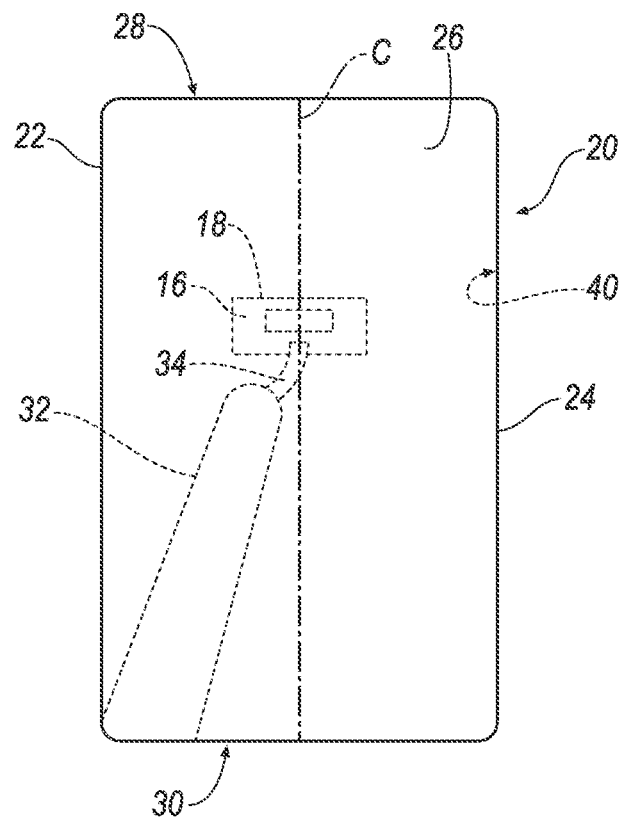
FIG. 4 is a front view of the airbag in the inflated position, and the first tether connecting the base to the extension, with the extension in the undeployed position.
Figure 5:
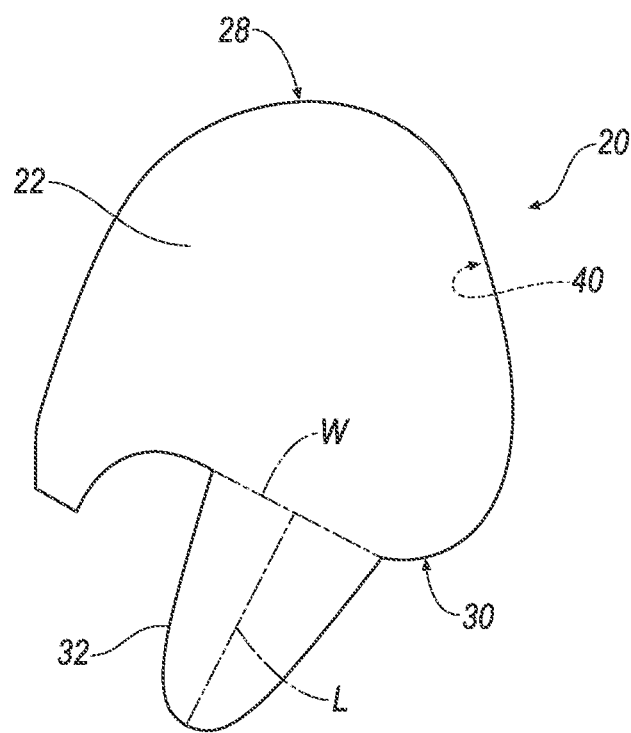
FIG. 5 is a side view of the airbag in the inflated position and the extension in the deployed position.
Figure 6A:
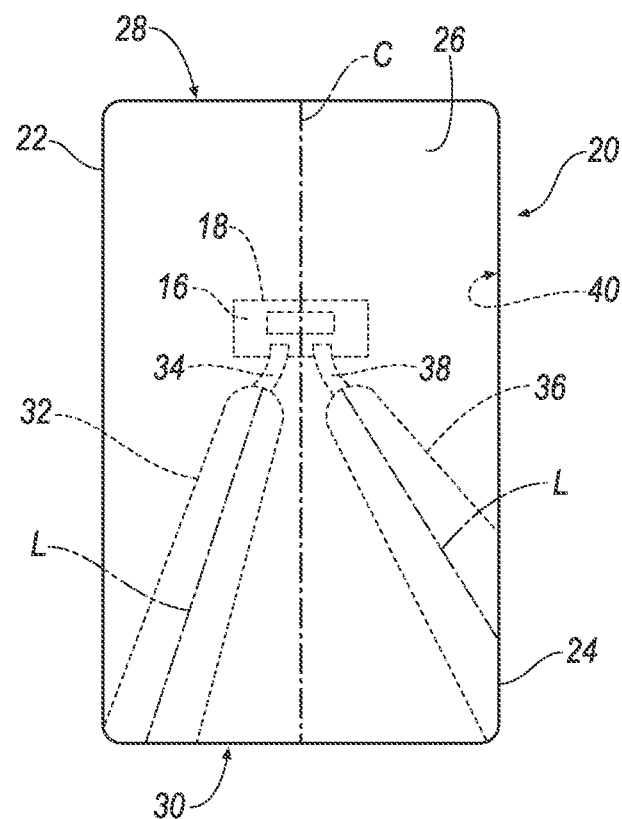
FIG. 6A is a front view of another example of an airbag in an inflated position, and a first tether and a second tether connecting an extension and a second extension to a base, with the extension and the second extension in an undeployed position.
Figure 6B:
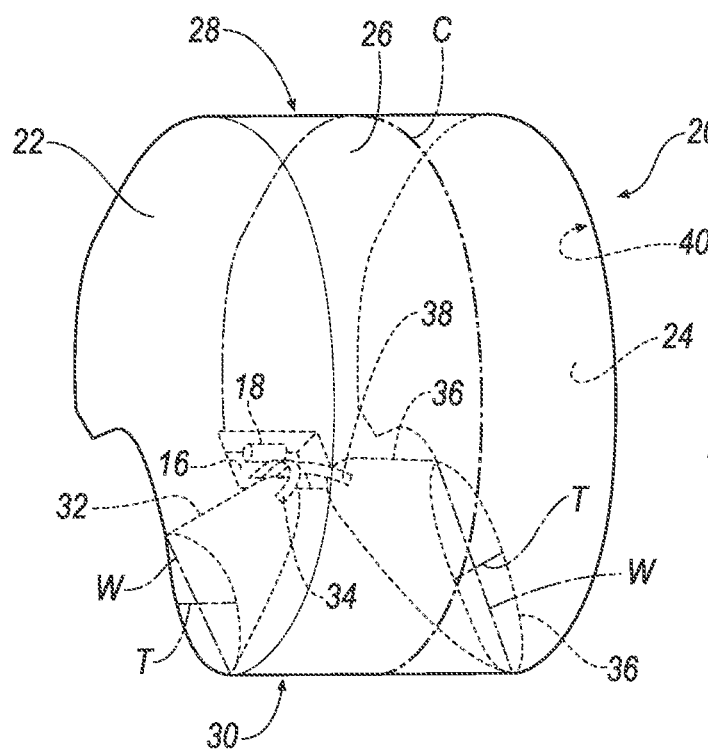
FIG. 6B is a perspective view of the airbag from FIG. 6A with the airbag in the inflated position, and the first tether and the second tether connecting an extension and a second extension to the base, with the extension and the second extension in the undeployed position.
Figure 6C:
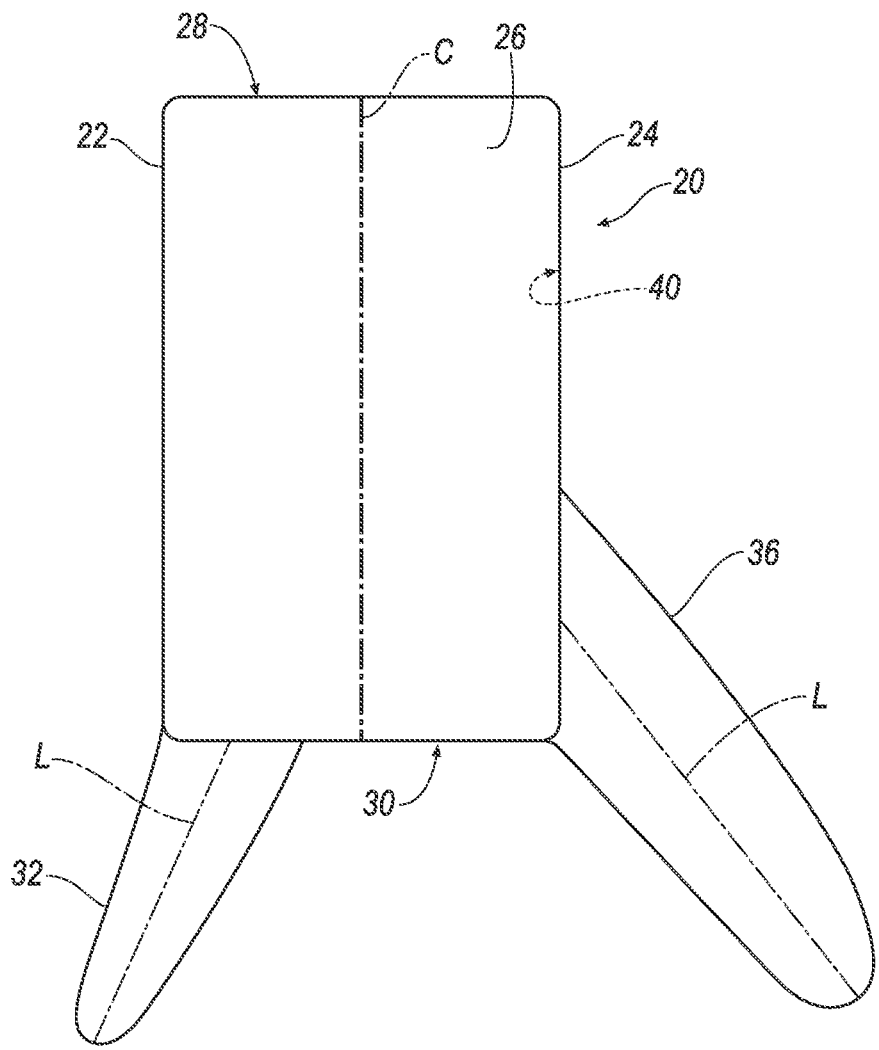
FIG. 6C is a front view of the example of the airbag from FIG. 6A with the airbag in the inflated position, and the first tether and the second tether released from the base, with the extension and the second extension in a deployed position.

The airbag 20 may include a first side panel 22, a second side panel 24 spaced from the first side panel 22, a middle panel 26, and at least one extension, e.g., an extension 32 and/or a second extension 36, as shown in FIGS. 2-6C. The first side panel 22, the second side panel 24, the middle panel 26 and the at least one extension can define an inflation chamber 40. The inflation chamber 40 may be inflatable to inflate the airbag 20, including the at least one extension, from an uninflated position, as shown in FIG. 1, to an inflated position, as shown in FIGS. 3-6C. One embodiment of the airbag 20 is shown in FIGS. 2-5 and another embodiment of the airbag 20 is shown in FIGS. 6A-C. Common numerals are used to identify common elements in the embodiments of FIGS. 2-5 and 6A-C.

As shown in FIGS. 2-6C, when the airbag 20 is in the inflated position, the middle panel 26 extends from the first side panel 22 to the second side panel 24 and extends transverse to the first and the second side panels. In the inflated position, the middle panel 26 includes a top 28 and a bottom 30, and has a centerline C between the first side panel 22 and the second side panel 24. The top 28 and the bottom 30 are on the centerline C and are spaced from each other along the centerline C. Depending on the shape of the airbag 20, the top 28 and the bottom 30 may be surfaces adjacent ends of the middle panel 26 (as shown in FIG. 3), or may be the ends of the middle panel 26, i.e., where the middle panel 26 terminates. In the configuration where the top 28 and the bottom 30 are panels adjacent ends of the middle panel 26, as shown in FIG. 3, the middle panel 26, including the top 28 and the bottom 30, may be one-piece, or the top 28 and the bottom 30 may be connected to the rest of the middle panel 26 in any suitable fashion, e.g., stitching, adhesives, chemical welding, staples, and the like.

As discussed above, the airbag 20 includes at least one extension. Specifically, the airbag 20 may include the extension 32 and/or the second extension 36, and/or any other suitable number of extensions. The at least one extension 32, 36 may be selectively deployable from an undeployed position, as shown in FIGS. 2, 4, 6A, and 6B, to a deployed position, as shown in FIGS. 3, 5, and 6C.

The extensions 32, 36 may be deployed from the undeployed position to the deployed position in any suitable fashion. As one example, a first tether 34 may connect the extension 32 to the base 16 of the airbag assembly 14, and a second tether 38 may connect the second extension to the base 16 of the airbag assembly 14. The base 16 can be configured to selectively release the first tether 34 and/or the second tether 38 to release the extensions 32, 36, respectively, to the deployed position.

Specifically, the airbag assembly 14 may be a component of a passive restraint system 100, shown schematically in FIG. 7 and discussed further below. The passive restraint system 100 can include an impact sensing system 102. The impact sensing system 102 can include at least one sensor 104 for sensing, e.g., a direction of an impact of the vehicle 10.

The passive restraint system 100 may include a controller 106. The controller 106 may be programmed to provide instructions to release one, both, or neither of the first tether 34 and the second tether 38 in response to the direction of an impact of the vehicle 10, as detected by the impact sensing system 102. In this way, the airbag 20 may be inflated to the inflated position, and the at least one extension, e.g., extension 32 and the second extension 36, may be selectively deployed to the deployed position, based on the direction of an impact.

With reference to FIG. 4, the airbag 20 is shown in the inflated position, with the extension 32 of the airbag 20 in the undeployed position. The first tether 34 connects the extension 32 to the base 16 of the airbag assembly 14. The base 16 may include release mechanisms 52, as shown in FIG. 7. The release mechanisms 52 may support the tethers, e.g., the first tether 34 and the second tether 38. As discussed above, the base 16 can be configured to selectively release the first tether 34 and/or the second tether 38.

For example, the release mechanisms 52 of the base 16 may include cutters (not shown) configured to cut one or both of the first tether 34 and the second tether 38 in response to instructions by the controller 106. Specifically, when the impact sensing system 102 senses an impact of the vehicle 10 for which the extension 32, the second extension 36, or both, should be deployed, the cutters may release, i.e., cut, the first tether 34, the second tether 38, or both.

As an alternative to cutters, the release mechanisms 52 may include jaws (not shown) engaged with the first and the second tethers 34, 38. The jaws can be configured to retain the first and the second tethers 34, 38 until instructed by the controller 106 to release them.

As shown in FIG. 1, the vehicle 10 may include a passenger cabin 42. The airbag assembly 14 may be disposed in the passenger cabin 42. The passenger cabin 42 can house occupants 48 of the vehicle 10, who may be seated in a driver seat 44 and a front passenger seat 46. The driver seat 44 and the front passenger seat 46 may face in a direction toward the instrument panel 12.

The instrument panel 12 may be disposed at a vehicle-forward end of the passenger cabin 42. The instrument panel 12 can support the airbag assembly 14. For example, as shown in FIG. 1, the airbag assembly 14 may be disposed in the instrument panel 12 in a vehicle-forward position relative to the occupant 48 in the front passenger seat 46, i.e., may be a passenger airbag. As another example, the airbag assembly 14 may be supported by a steering wheel in a vehicle-forward position relative to an occupant of the driver seat 44, i.e., may be a driver airbag.

As shown in FIG. 2, the vehicle 10 may be subjected to a full frontal impact, as represented by arrow F. The full frontal impact may urge the occupant 48 forward in a direction of the instrument panel 12. Under these conditions, the passive restraint system 100 may inflate the airbag 20 to the inflated position, and not release the first tether 34, maintaining the extension 32 in the undeployed position.

With reference to FIG. 3, the vehicle 10 may be subjected to a left oblique impact, as represented by the arrow F. The left oblique impact may urge the occupant 48 forward and to the left, in a direction of the instrument panel 12 and a center console 50. The center console 50 may include a console wall (not shown) adjacent a left leg of the occupant 48.

Under these conditions, the passive restraint system 100 may inflate the airbag 20 to the inflated position and release the first tether 34. In this way, the extension 32 may deploy to the deployed position, e.g., extending between the left leg of the occupant 48 and the wall of the center console 50, to absorb energy from the left leg of the occupant 48, which may result in a reduction of impact energy transferred to the left leg of the occupant 48.

As discussed above, in the example of the airbag 20 shown in FIGS. 2-5, the at least one extension, i.e., extension 32, is connected to the bottom 30 of middle panel 26. Alternatively, the extension 32 may be connected to the first side panel 22 of the airbag 20.

When the airbag 20 is in the inflated position and the extension 32 is deployed to the deployed position, the extension 32 is spaced from the centerline C of the middle panel 26, and can be extendable in a direction away from the top 28 of the middle panel 26.

The second extension 34 may be connected to at least one of the second side panel 24 and the bottom 30 of the middle panel 26. When the airbag 20 is in the inflated position and the second extension 36 is deployed to the deployed position, the second extension 36 is spaced from the centerline C of the middle panel 26, and can be extendable in a direction away from the top 28 of the middle panel 26.

As shown in FIGS. 3-5, the extension 32 can have a width W extending along the first side panel 22. The width W may extend in a vehicle fore and aft direction when the airbag 20 is in the inflated position, and the extension is deployed to the deployed position. The extension 32 may have a thickness T in a direction perpendicular to the width W, i.e., generally in a cross-vehicle direction. The extension 32 may have a length L extending in a direction perpendicular to the width W and the thickness T. The length L and the width W of the extension 32 may be greater than the thickness T, as shown in FIG. 3. In other words, the extension 32 may be elongated along the length L and along the width W and flat along the thickness T, as shown in FIG. 3.

As shown in FIGS. 3 and 5, when the extension 32 is in the deployed position, the extension 32 is spaced from the centerline C of the middle panel 26, and extends in a direction away from the top 28 of the middle panel 26, e.g., in a direction toward a floor (not shown) of the vehicle 10. The extension 32 may extend in a direction transverse to the centerline C of the middle panel 26. Alternatively, the extension 32 can extend in a direction away from the top 28 of the middle panel 26 and parallel to the centerline C of the middle panel 26.

Another example of an airbag 20 is shown in FIGS. 6A-C. In this example of the airbag 20, the airbag 20 includes an extension 32 and a second extension 36. Alternatively, the airbag 20 could include only the second extension 36.

The second extension 36 may be connected to the second side panel 24 of the airbag 20, as shown in FIGS. 6A-C. Alternatively, the second extension 36 may be connected to the bottom 30 of the middle panel 26. The second tether 38 can connect the second extension 36 to the base 16 of the airbag assembly 14. As shown in FIG. 6C, the second extension may be deployed to the deployed position, as discussed above.

When the second extension 36 is deployed to the deployed position, the second extension 36 is spaced from the centerline C of the middle panel 26, and extends in a direction away from the top 28 of the middle panel 26, e.g., in a direction toward the floor of the vehicle 10. The second extension 36 may extend in a direction transverse to the centerline C of the middle panel 26. Alternatively, the second extension 36 can extend in a direction away from the top 28 of the middle panel 26 and parallel to the centerline C of the middle panel 26.

As shown in FIG. 6B, the second extension 36 can have a width W extending along the second side panel 24. The width W may extend in a vehicle fore and aft direction when the airbag 20 is in the inflated position, and the second extension 36 is deployed to the deployed position. The second extension 36 may have a thickness T in a direction perpendicular to the width W, i.e., generally in a cross-vehicle direction. The second extension 36 may have a length L extending in a direction perpendicular to the width W and the thickness T. The length L and the width W of the second extension 36 may be greater than the thickness T, as shown in FIGS. 6B and 6C. In other words, the second extension 36 may be elongated along the length L and the along the width W and flat along the thickness T, as shown in FIGS. 6B and 6C.

As shown in FIGS. 6B and 6C, the extension 32 and the second extension 36 extend toward opposite sides from the centerline C. As set forth above, the extension 32 and the second extension 36 may be selectively deployed to the deployed position, i.e., one, both, or neither of the extensions 32, 36 may be deployed to the deployed position when the airbag 20 is inflated to the inflated position.

For example, in a right oblique impact, the occupant 48 in the front passenger seat 46 may be urged forward and to the right, in a direction of a passenger side door. Under these conditions, the passive restraint system 100 may inflate the airbag 20 to the inflated position and release the second tether 38. In this way, the second extension 36 may deploy to the deployed position, e.g., extending between a right leg of the occupant 48 and the passenger side door, to absorb energy from the right leg of the occupant 48, which may result in a reduction of impact energy transferred to the right leg of the occupant 48.

When both the extension 32 and the second extension 36 are in the deployed position, the extension 32 and the second extension 36 form an envelope that may receive the legs of the occupant 48, i.e., the extension 32 and the second extension 36 extend on opposite sides of the legs of the occupant 48.

In FIGS. 6A-C, for example, the extension 32 extends from the bottom 30 of the middle panel 26 and the second extension 36 extends from the second side panel 24. Alternatively, the extension 32 may extend from bottom 30 and/or the first side panel 22, and the second extension 36 may extend from the bottom 30 and/or the second side panel 24.

The airbag 20, including the at least one extension, e.g., the extension 32 and the second extension 36, may be formed of any suitable airbag material, such as a woven polymer. For example, the airbag 20 and the at least one extension may be formed of woven nylon yarn, such as, nylon 6-6. Other suitable materials include polyether ether ketone (PEEK), polyetherketoneketone (PEKK), polyester, and/or any other suitable polymer. The woven polymer may include a coating, such as silicone, neoprene, urethane, and so on. For example, the coating may be polyorgano siloxane. The airbag 20, including the first side panel 22, the second side panel 24, the middle panel 26 and the at least one extension, may all be formed of the same material, or may be formed of different materials.

The first and the second side panels 22, 24, the middle panel 26, and the at least one extension may each be a single piece of material, multiple pieces of material attached together, or a combination thereof.

The extension 32 and the second extension 36 may be stitched to the airbag 20, or otherwise connected to the airbag 20 in any suitable fashion, such as with adhesives, chemical welding, staples, and the like. The at least one extension, e.g., extension 32 and second extension 36, can be formed from the same piece of material as some or all of the airbag 20, such as middle panel 26, as discussed above.

Figure 7:
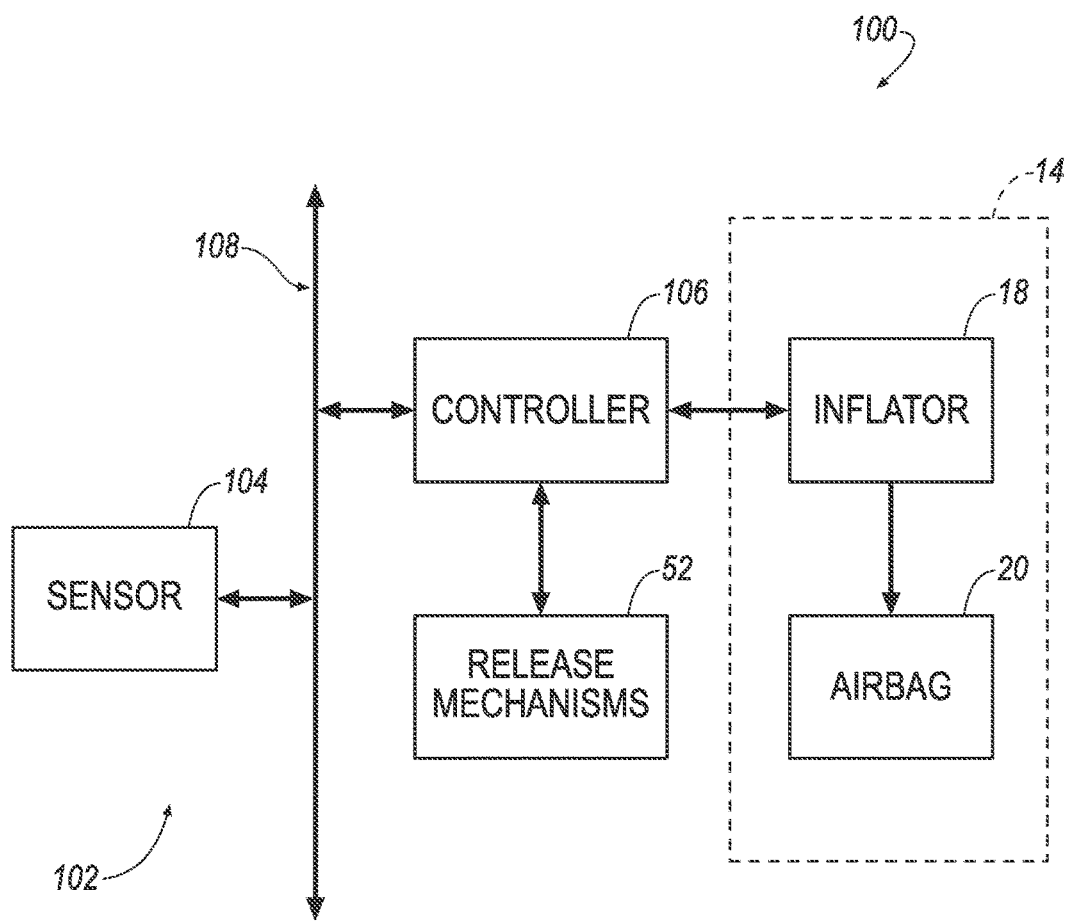
FIG. 7 is a schematic of a passive restraint system including the airbag.

A schematic of the passive restraint system 100, including the impact sensing system 102, is shown in FIG. 7. The impact sensing system 102 may include at least one sensor 104 for sensing, e.g., a direction of impact of the vehicle 10. The sensor 104 is the only component of the impact sensing system 102 shown in FIG. 7. It should be appreciated, however, that the impact sensing system 102 can include additional components not shown in FIG. 7.

The controller 106 and the sensor 104 may be connected to a communication bus 108, such as a controller area network (CAN) bus, of the vehicle 10. The controller 106 may use information from the communication bus 108 to control the activation of the inflator 18. The inflator 18 may be connected to the controller 106, as shown in FIG. 7, or may be connected directly to the communication bus 108.

The controller 106 may be in communication with the sensor 104 and the inflator 34, directly or through the communication bus 108, for activating the inflator 18, e.g., for providing an impulse to a pyrotechnic charge of the inflator 18, when the sensor 104 senses an impact of the vehicle 10. Alternatively or additionally to sensing impact, the impact sensing system 102 may be configured to sense impact prior to impact, i.e., pre-impact sensing. The sensor 104 may be of any suitable type, e.g., using radar, lidar, and/or a vision system. The vision system may include one or more cameras, CCD image sensor, and/or CMOS image sensor, etc.

The controller 106 may be a microprocessor-based controller. The sensor 104 is in communication with the controller 106 to communicate data to the controller 106. Based on the data communicated by the sensor 104, the controller 106 may instruct the inflator 18 to activate.

In operation, the airbag 20 is in an uninflated position, as shown in FIG. 1, under normal operating conditions of the vehicle 10. When the sensor 104 senses an impact of the vehicle 10, the impact sensing system 102 triggers communication to the controller 106 identifying the impact. In response, the controller 106 instructs the inflator 18 to inflate the airbag 20 with the inflation medium from the uninflated position to the inflated position. Based on the type of impact sensed by the impact sensing system 102, the controller 106 may selectively deploy the extensions 32, 36. For example, in the embodiment of FIGS. 2-5, the controller 106 may either retain the extension 32 in the undeployed position, or release the extension 32 to the deployed position, as set forth above. As another example, in the embodiment of FIGS. 6A-C, the controller 106 may retain the extension 32 and/or the second extension 36 in the undeployed position, and may release the extension 32 and/or the second extension 36 to the deployed position, as set forth above.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. An airbag inflatable to an inflated position, the airbag comprising:
a first side panel and a second side panel spaced from each other;
a middle panel extending from the first side panel to the second side panel transverse to the first and the second side panels in the inflated position;
the middle panel having a centerline between the first and second side panels, the middle panel having a top and a bottom spaced from each other along the centerline; and
an extension spaced from the centerline and connected to at least one of the first side panel and the bottom of the middle panel and a length of the extension extendable in a direction away from the top of the middle panel and toward a floor of a vehicle in a deployed position.

2. The airbag of claim 1, wherein the first side panel, the second side panel, the middle panel, and the extension define an inflation chamber.

3. The airbag of claim 1, wherein the extension extends from the at least one of the first side panel and the bottom of the middle panel in a direction transverse to the centerline.

4. The airbag of claim 1, wherein the extension has a width extending in a direction along the first side panel and a thickness in a direction perpendicular to the width, the width being greater than the thickness.

5. The airbag of claim 1 further comprising a base supporting the airbag, and a first tether connecting the base to the extension.

6. The airbag of claim 5, wherein the base is configured to selectively release the first tether.

7. The airbag of claim 1 further comprising a second extension spaced from the centerline and connected to at least one of the second side panel and the bottom of the middle panel and extendable in a direction away from the top of the middle panel in a deployed position.

8. The airbag of claim 7, wherein the second extension extends from the at least one of the second side panel and the bottom of the middle panel in a direction transverse to the centerline.

9. The airbag of claim 7, wherein the second extension has a length extending in a direction along the second side panel and a width perpendicular to the length, the length being greater than the width.

10. The airbag of claim 7 further comprising a base supporting the airbag, and a second tether connecting the base to the second extension.

11. The airbag of claim 10, wherein the base is configured to selectively release the second tether.

12. A vehicle comprising:
an instrument panel;
an airbag assembly including a base supported by the instrument panel and an airbag supported by the base, the airbag being inflatable from an uninflated position to an inflated position;
the airbag including a first side panel and a second side panel spaced from each other;
a middle panel extending from the first side panel to the second side panel transverse to the first and second side panels in the inflated position;
the middle panel having a centerline between the first and second side panels, the middle panel having a top and a bottom spaced from each other along the centerline; and
an extension spaced from the centerline and connected to at least one of the first side panel and the bottom of the middle panel and a length of the extension extendable in a direction away from the top of the middle portion and toward a floor of the vehicle in a deployed position.

13. The airbag of claim 12, wherein the first side panel, the second side panel, the middle panel, and the extension define an inflation chamber.

14. The vehicle of claim 12, wherein the extension has a width extending in a direction along the first side panel and a thickness in a direction perpendicular to the width, the width being greater than the thickness.

15. The vehicle of claim 12 further comprising a first tether connecting the base to the extension.

16. The vehicle of claim 15, wherein the base is configured to selectively release the first tether.

17. The vehicle of claim 12 further comprising a second extension spaced from the centerline and connected to at least one of the second side panel and the bottom of the middle panel and extendable in a direction away from the top of the middle panel in a deployed position.

18. The vehicle of claim 17, wherein the second extension has a width extending in a direction along the second side panel and a thickness perpendicular to the width, the width being greater than the thickness.

19. The airbag of claim 18 further comprising a second tether connecting the base to the second extension.

20. The airbag of claim 19, wherein the base is configured to selectively release the second tether.

* * * * *